3,398,146
TETRAHYDRO-1,3,5-THIADIAZINE-2-THIONES
Manfred Schorr and Walter Dürckheimer, Frankfurt am Main, and Georg Lämmler, Hattersheim (Main), Germany, assignors to Farbwerke Hoechst Aktiengesellschaft vormals Meister Lucius & Bruning, Frankfurt am Main, Germany, a corporation of Germany
No Drawing. Filed June 30, 1965, Ser. No. 468,596
Claims priority, application Germany, June 30, 1964, F 43,304
8 Claims. (Cl. 260—243)

ABSTRACT OF THE DISCLOSURE

Tetrahydro-1,3,5-thiadiazine-2-thiones having antimycotic and antibacterial activity.

---

It is known to prepare tetrahydro-1,3,5-thiadiazine-2-thiones by reaction of primary amines with carbon disulfide and alkali and subsequent reaction with formaldehyde and another primary amine. Up to now, however, no derivatives have been described which are substituted in 5-position by an aminoalkyl radical.

Now we have found that tetrahydro-1,3,5-thiadiazine-2-thiones of the formula

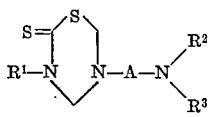

in which $R^1$ represents a phenylalkyl radical which may be substituted by halogen atoms, A represents a low-molecular alkylene group which may be ramified, and $R^2$ and $R^3$ stand for low molecular alkyl radicals which may form together with the nitrogen atom a saturated heterocyclic ring of 5 to 7 ring members which may be interrupted by oxygen, sulfur or nitrogen, can be obtained by reacting a primary amine of the formula $R^1$—$NH_2$, in which $R^1$ has the meaning given above, in the presence of a basic condensing agent with carbon disulfide, then reacting the corresponding dithiocarbamate obtained with formladehyde and a salt of a diamine of the formula

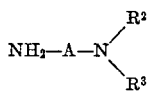

wherein A, $R^2$ and $R^3$ stand for the radicals mentioned above, and, if desired, converting the bases obtained in this manner into physiologically tolerable acid addition salts.

As amines of the formula $R^1$—$NH_2$ there may be used, in particular, benzyl- and β-phenylethylamine as well as derivatives thereof, which are substituted on the aromatic nucleus by halogen atoms, preferably by chlorine. Aralkylamines having a longer or a branched alkyl chain are also suitable. Apart from the amines mentioned the reaction may be carried out, for example with the following amines:

4-chlorobenzylamine,
3,4-dichlorobenzylamine,
2,4-dichlorobenzylamine,
3,5-dichlorobenzylamine,
2,5-dichlorobenzylamine,
4-bromobenzylamine,
4-fluorophenylethylamine,
3,4-dichlorophenylethylamine,
2,4-dichlorophenylethylamine,
4-chlorophenylpropylamine,
4-chlorophenylbutylamine,
4-chloro-α-ethylbenzylamine.

Further starting substances suitable for use in the process of the invention are alkylene diamines containing a primary and a tertiary amino group. The alkylene chain may be branched or straight and may contain from 2 to 6 carbon atoms.

The following compounds may be mentioned as examples thereof:

2-dimethylamino-ethylamine,
2-diethylamino-ethylamine,
2-dipropylamino-ethylamine,
2-piperidino-ethylamine,
2-pyrrolidino-ethylamine,
2-morpholino-ethylamine,
2-piperazino-ethylamine,
3-hexamethylene-iminopropylamine,
2-diethylamino-propylamine-(1),
1-diethylamino-propylamine-(2),
3-diethylamino-propylamine-(1),
4-diethylamino-butylamine-(1),
3-diethylamino-butylamine-(1),
3-diethylamino-butylamine-(2),
1-diethylamino-butylamine-(3),
2-diethylamino-3-methylpropylamine-(1),
5-diethylamino-pentylamine-(1),
5-piperidino-pentylamine-(1),
6-diethylamino-hexylamine-(1).

The process according to the invention is carried out by first reacting a primary amine with carbon disulfide and alkali to yield a corresponding dithiocarbamate. The reactants may be used in molar proportions. As basic condensing agents there are suitable the hydroxides or carbonates of alkali metals and alkaline-earth metals, or tertiary amines. Sodium hydroxide and potassium hydroxide have proved particularly suitable.

It is not necessary to isolate the dithiocarbamates as pure substance, since the solutions obtained can be directly reacted further with formaldehyde and a diamine. As intermediary products from the dithiocarbamic acids and the diamines there are formed salts which are sparingly soluble in water and precipitate, and thus do not take part in the reaction proper. In order to obtain satisfactory yields it is therefore advantageous to prepare the dithiocarbamate in the presence of sufficient amounts of a solvent which is miscible with water. Suitable for this purpose are, for example, methanol, ethanol, propanol, acetone, dioxane, tetrahydrofurane, acetonitrile or dimethylformamide.

For further reaction at least 2 mols of formaldehyde, preferably in the form of an aqueous solution, and at least 1 mol of an alkylene-diamine, in the form of a salt with at least one equivalent of an acid, are added to the solution of the dithiocarbamate. As salt-forming components there are suitable organic and inorganic acids such, for example, as hydrohalic acids, sulfuric acid, amidosulfonic acid, phosphoric acid, acetic acid, propionic acid and others; it is advantageous to use monohydrochlorides. The reaction may be carried out at slightly reduced or slightly elevated temperatures. The simplest method is to work at room temperature. The amine salts are advantageously added to the reaction mixture in dissolved state. Usually, the tetrahydro-1,3,5-thiadiazine-2-thiones do not separate. In order to isolate them, the solution is concentrated in vacuo to a considerable extent, the residue is treated with alkali and taken up with an appropriate solvent, from which the compound crystallizes after drying and cooling. In the majority of cases, ethylacetate has proved particularly suitable for the purpose.

The products according to the invention are usually obtained in the form of colorless crystals or, rarely, in the form of yellowish oils. These can be converted in known manner into acid addition salts which likewise form colorless crystals and dissolve more or less readily in water depending on the nature of the acid component.

The tetrahydro-1,3,5-thiadiazine-2-thiones prepared according to the process of the invention are valuable medicaments. For example, they are distinguished by an excellent fungistatic and bacteriostatic activity.

It is to be emphasized that the products of the invention are especially suitable for application in an acid medium which is in many cases a prior condition for a successful thereapy, for instance in the local treatment of dermatomycoses. In this respect, the products of the invention are superior to the tetrahydro-1,3,5-thiadiazine-2-thiones known up to now which have been described, for instance in Arch. Pharm. 293, 957 (1960) or in Arch. Pharm. 296, 770 (1963). Whereas the latter are either nearly insoluble in water or, in the form of alkali metal salts, reprecipitate the sparingly soluble acids at pH-values below 7, the compounds obtained according to the process of the present invention, in the form of their acid addition salts, dissolve readily in water at a pH-value within an acid to neutral range and have a fungistatic and bacteriostatic activity which is equal to that of the known derivatives or even superior. Moreover—and this is surprising—the products of the invention show a strong anthelmintic activity, in particular against various types of small liver flukes. Special importance is to be attached to their activity against *Dicrocoelium dendriticum* and *Opisthorchis felineus* which may be demonstrated in chemotherapeutical tests in the golden hamster. For this purpose, the compound to be tested is orally administered on three consecutive days (once a day) to the animals infected with small liver flukes. The success of the treatment is determined by examination of the faeces according to the process by Telemann before the treatment as well as on the 14th and the 20th day after the treatment and by autopsy of the animals. As dosis curativa minima is to be regarded the dose by which the infection with *Dicrocoleium dendriticum* or *Opisthorchis felineus* could be removed after three administrations to the animals.

The values determined in the above-described manner after application of some of the products of the invention have been compiled in the following tables. Moreover, the tables contain some of the compounds described in Arch. Pharm. 293, 957 (1960) and Arch. Pharm. 296, 770 (1963) which are comparable in structure but show no activity against the parasites mentioned.

For local application the products may be used mainly in the form of ointments, creams, tinctures, jellies, suspensions, solutions, sprays, etc. They are based on the usual liquid or semi-solid pharmacologically acceptable carriers, such as fats and oils, organic solvents, glycerin etc. The preparations contain 0.05–5%, preferably 0.5–1.5% of the active ingredients.

TABLE I.—ACTIVITY AGAINST *DICROCOELIUM DENDRITICUM*

| Substance: | Dosis curativa minima in mg./kg. of body weight orally administered |
|---|---|
| 3 - (4 - chlorophenylethyl) - 5 - (2-diethyl-amino - ethyl) - tetrahydro - 1,3,5 - thiadiazine-2-thione | 3×100 |
| 3 - (3,4 - dichlorophenylethyl) - 5 - (2 - diethyl - amino - ethyl) - tetrahydro - 1,3,5-thiadiazine-2-thione-hydrochloride | 3×100 |
| 3 - (3,4 - dichlorobenzyl) - 5 - (2 - diethyl-amino - ethyl) - tetrahydro - 1,3,5 - thiadiazine-2-thione-hydrochloride | 3×40 |
| 3 - benzyl - 5 - (2 - hydroxyethyl) - tetrahydro-1,3,5-thiadiazine-2-thione | Inactive |
| 3 - phenylethyl - 5 - isopropyl-tetrahydro-1,3,5-thiadiazine-2-thione | Inactive |
| 3 - (4 - chlorobenzyl - 5 - carboxymethyl)-tetrahydro-1,3,5-thiadiazine-2-thione | Inactive |

TABLE II.—ACTIVITY AGAINST *OPISTHORCHIS FELINEUS*

| Substance: | Dosis curativa minima in mg./kg. of body weight orally administered |
|---|---|
| 3 - (2,4-dichloro-phenylethyl)-5-(2-diethyl-aminoethyl) - tetrahydro - 1,3,5-thiadiazine-2-thione-hydrochloride | 3×150 |
| 3 - (3,4 - dichlorobenzyl) - 5-(3-piperidino-propyl) - tetrahydro - 1,3,5 - thiadiazine-2-thione-hydrochloride | 3×150 |
| 3 - benzyl - 5-(3-diethylaminopropyl)-tetrahydro - 1,3,5-thiadiazine-2-thione-hydrochloride | 3×150 |
| 3 - benzyl - 5-(2-hydroxyethyl)-tetrahydro-1,3,5-thiadiazine-2-thione | Inactive |
| 3 - phenylethyl - 5 - isopropyl - tetrahydro-1,3,5-thiadiazine-2-thione | Inactive |
| 3 - (4-chlorobenzyl-5-carboxymethyl)-tetrahydro-1,3,5-thiadiazine-2-thione | Inactive |

The following example serves to illustrate the invention but it is not intended to limit it thereto.

Example

3 - benzyl - 5 - (2-diethylaminoethyl)-tetrahydro-1,3,5-thiadiazine-2-thione.—64 grams of benzylamine are dissolved in 250 cc. of methanol and 36.3 cc. of carbon disulfide and 0.6 mol of a 50% sodium hydroxide solution are dropwise added, while stirring, at 20° C. A solution of sodium-benzyldithiocarbamate is formed. To this solution 90 cc. of a 40% formaldehyde solution and 70 grams of diethylamino-ethylamine dissolved in 150 cc. of a methanolic 5 N-hydrochloric acid are added one after the other. About 75% of the original amount of methanol used are separated from the reaction mixture by distillation in vacuo. The residue is treated with 300 cc. of normal sodium hydroxide solution and extracted twice with 200 cc. each of ethylacetate. The combined organic layers are dried over sodium sulfate and cooled with a mixture of NaCl and ice. The 3-benzyl-5-(2-diethylamino - ethyl) - tetrahydro - 1,3,5 - thiadiazine - 2-thione crystallizes out in the form of colorless crystals. Yield: 118 grams (61% of the theoretical yield); melting point: 58–59° C.

When adding to the ethylacetate solution obtained in the manner described above alcoholic hydrochloric acid until the solution shows an acid reaction and cooling to 0° C., there is obtained the hydrochloride of 3-benzyl-5-(2 - diethyl - aminoethyl)-tetrahydro-1,3,5-thiadiazine-2-thione. Yield: 168 grams (78% of the theoretical yield); melting point: 157–158° C.

In analogous manner there are obtained:

from phenylethylamine, carbon disulfide, formaldehyde and 1-dimethylamino-propylamine-(2): 3-phenylethyl-5 - (3 - dimethylamino - 2 - propyl)-tetrahydro-1,3,5-thiadiazine-2-thione melting at 114–116° C.;

from 4-chlorophenyl-ethylamine, carbon disulfide, formaldehyde and 1-dimethylamino-propylamine-(2): 3-(4 - chlorophenylethyl) - 5 - (3-dimethylamino-2-propyl) - tetrahydro - 1,3,5-thiadiazine-2-thione melting at 106–107° C.;

from 3,4-dichlorophenylethylamine, carbon disulfide, formaldehyde and 2-diethylamino-ethylamine: 3-(3,4-dichloro - phenylethyl) - 5-diethylamino-ethyl-tetrahydro-1,3,5-thiadiazine-2-thione melting at 114° C. (melting point of the hydrochloride: 164° C.);

from 4-chlorophenylethylamine, carbon disulfide, formaldehyde and 2-diethylamino-ethylamine. 3-(4-chlorophenylethyl) - 5 - diethylamino-ethyl-tetrahydro-1,3,5-thiadiazine-2-thione melting at 70–72° C.;

from 3,4-dichlorobenzylamine, carbon disulfide, formaldehyde and 3-piperidinopropylamine: 3-(3,4-dichlorobenzyl) - 5 - (3 - piperidino-propyl)-tetrahydro-1,3,5-thiadiazine-2-thione melting at 96–98° C. (melting point of the hydrochloride: 164–166° C.);

from 3,4-dichlorobenzylamine, carbon disulfide, formaldehyde and 2 - diethylamino - ethylamine: 3 - (3,4-dichlorobenzyl) - 5 - diethylamino-ethyltetrahydro-1,3,5-thiadiazine-2-thione melting at 86–88° C. (melting point of the hydrochloride: 170–171° C.);

from benzylamine, carbon disulfide, formaldehyde and 3 - diethylamino - propylamine: 3-benzyl-5-(3-diethylamino - propyl) - tetrahydro-1,3,5-thiadiazine-2-thione melting at 54–56° C. (melting point of the hydrochloride: 157° C.);

from 2,4-dichlorophenylethylamine, carbon disulfide, formaldehyde and 2-diethylamino-ethylamine: 3(2,4-dichlorophenylethyl) - 5-diethylaminoethyl-tetrahydro-1,3,5-thiadiazine-2-thione melting at 74–76° C. (melting point of the hydrochloride: 122–124° C.);

from benzylamine, carbon disulfide, formaldehyde and 3-dimethylamino-propylamine: 3-benzyl-5-(3-dimethylamino - propyl) - tetrahydro-1,3,5-thiadiazine-2-thione melting at 172–173° C. (in the form of a hydrochloride).

We claim:
1. A compound selected from the group consisting of (1) tetrahydro-1,3,5-thiadiazine-2-thiones of the formula

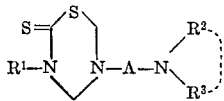

in which $R^1$ is a member selected from the group consisting of phenyl-lower alkyl and halophenyl-lower alkyl, A is alkylene of from 2 to 6 carbon atoms, and

represents a member selected from the group consisting of a di-lower alkyl amino group, piperidino, pyrrolidino, morpholino, piperazino and hexamethylene-imino, and (2) physiologically tolerable acid addition salts thereof.

2. 3-benzyl-5 - (2 - diethylamino - ethyl) - tetrahydro-1,3,5-thiadiazine-2-thione.

3. 3-(3,4-di-chlorophenylethyl) - 5 - diethyl - amino-ethyl-tetrahydro-1,3,5-thiadiazine-2-thione.

4. 3-(4-chlorophenylethyl) - 5 - diethylamino - ethyl-tetrahydro-1,3,5-thiadiazine-2-thione.

5. 3-(3,4-di-chlorobenzyl) - 5 - diethylamino - ethyl-tetrahydro-1,3,5-thiadiazine-2-thione.

6. 3-benzyl-5-(3-diethylamino - propyl) - tetrahydro-1,3,5-thiadiazine-2-thione.

7. 3(2,4-di-chlorophenylethyl)-5-diethyl - aminoethyl-tetrahydro-1,3,5-thiadiazine-2-thione.

8. 3-benzyl-5-(3-dimethylamino - propyl) - tetrahydro-1,3,5-thiadiazine-2-thione.

References Cited

UNITED STATES PATENTS

| | | | |
|---|---|---|---|
| 2,397,421 | 3/1946 | Kaiser | 260—243 |
| 2,838,389 | 6/1958 | Yoder | 260—243 |
| 3,085,046 | 4/1963 | Cummins | 260—243 |

OTHER REFERENCES

Ainley et al., J. Chem. Soc. (1944), pp. 147–52.

JOHN D. RANDOLPH, *Primary Examiner.*

J. M. FORD, *Assistant Examiner.*